Feb. 26, 1935.  G. A. LYON  1,992,671
SPARE WHEEL ASSEMBLY
Original Filed May 21, 1928
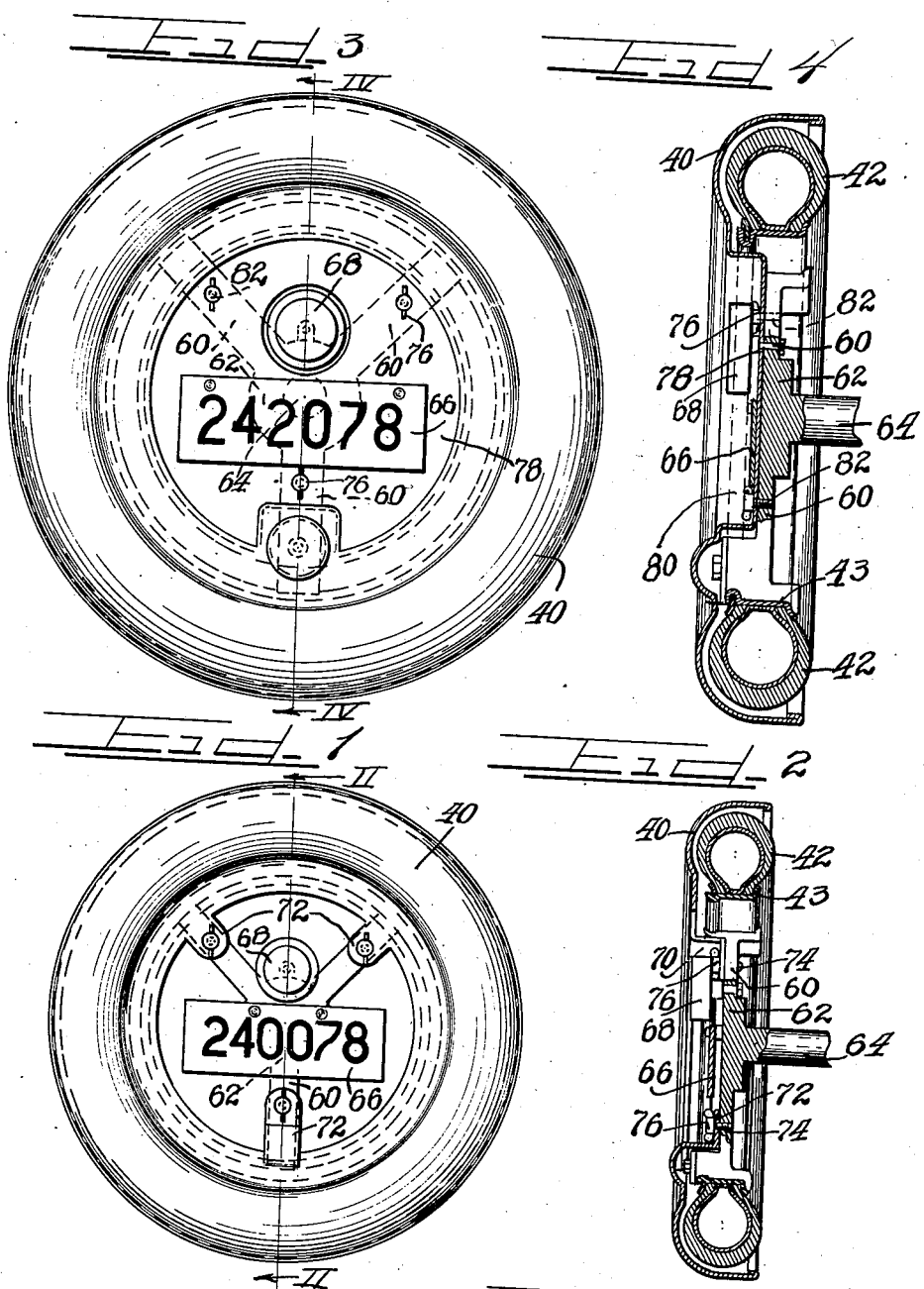

Patented Feb. 26, 1935

1,992,671

UNITED STATES PATENT OFFICE 1,992,671

SPARE WHEEL ASSEMBLY

George Albert Lyon, Detroit, Mich., assignor to Lyon Incorporated, Detroit, Mich., a corporation of Delaware Original application May 21, 1928, Serial No. 279,292, now Patent No. 1,924,084, dated August 22, 1933. Divided and application June 15, 1929, Serial No. 371,132, now Patent No. 1,955,710, dated April 17, 1934. Divided and this application November 1, 1933, Serial No. 696,225

4 Claims. (Cl. 150—54)

This invention relates to covers for spare tires carried upon automobiles.

The principal object of the present invention is to produce a cover for the spare tire of an automobile which has a highly attractive appearance, which may be readily applied to the tire, which is strong and durable in construction, which will protect the tire in a reliable manner against weather and damage from collision, and which will present a smooth outer surface at all times.

With this and other objects in view, the invention comprises the novel and improved features, constructions and combinations of parts hereinafter described and particularly pointed out in the claims, the advantages of which will be readily understood and appreciated by those skilled in the art.

The present application constitutes a division of applicant's copending application Serial No. 371,132 filed June 15, 1929, which issued as Patent No. 1,955,710 on April 17, 1934, and which constituted a division of applicant's earlier application Serial No. 279,292, filed May 21, 1928, issued as Patent No. 1,924,084 on August 22, 1933.

The invention will be clearly understood from the accompanying drawing illustrating the invention in its preferred form and the following detailed description therein shown.

In the drawing—

Figure 1 is a front elevation illustrating the tire cover embodying the invention applied to a tire.

Figure 2 is a sectional view taken on substantially the line II—II of Figure 1.

Figure 3 is a view in front elevation illustrating another form of the invention, and Figure 4 is a view taken on substantially the line IV—IV of Figure 3.

The present invention embodies a tire cover made of relatively stiff sheet material formed into the proper shape to constitute a protective covering for the tire. The cover is relatively stiff so that it will maintain its shape without any inside support. The cover may be made of various materials such as hard rubber, bakelite, or cloth impregnated with stiffening material, but is preferably formed of sheet metal. In actual practice, a cover made of sheet steel has been found to give highly satisfactory results.

In the form of the invention shown in the drawing of the present application, the tire cover indicated at 40 does not rest upon or contact with the tire but is curved to conform generally to the transverse and annular curvature of the tire and extends about the same in a position slightly spaced therefrom.

In the construction shown in Figures 1 and 2, the tire 42 is mounted on a rim 43 supported on a tire carrier. This tire carrier comprises a series of arms 60 extending outwardly from a central disc 62 attached to the rear end of a carrier shaft 64. In connection with tire carriers of this type a number plate indicated at 66 and a rear signal lamp indicated at 68 are frequently mounted, as shown, on the central portion of the tire carrier. The tire cover shown in these figures has a central portion cut away so as to expose the rear signal lamp and number plate.

As shown in Figure 1, the peripheral portion of the tire cover 40 is curved in cross section so as to conform to the cross-sectional curvature of the peripheral portion of the tire. The tire cover is depressed or bent inwardly as indicated at 70, this depressed portion being arranged to extend within the rim 43. To provide attaching means for attaching the cover in position with relation to the tire, the depressed portion 70 is formed at its inner margin with a series of projections or ears indicated at 72 for engagement with the arms 60 of the tire carrier. The tire cover is attached to the tire carrier by means of a series of bolts 74 passing through the openings in the ears 72 and threaded into the arms 60, these bolts having heads 76 suitable for manual operation.

The tire cover shown in Figures 3 and 4 also is adapted to be applied to a tire carrier of substantially the same form as that illustrated in Figures 1 and 2 having the rear signal lamp and number plate mounted in substantially the same position. In the construction shown in Figures 3 and 4, the tire cover consists of a sheet metal disc, the peripheral portion of which is curved in cross section so as to extend about the peripheral portion of the tire, preferably out of contact therewith, and the central portion of the same is depressed to form an attaching portion 78 for engagement with the outer faces of the arms 60 of the tire carrier, this central attaching portion extending completely across the tire carrier. The central portion of the disc is provided with a series of openings 80 for the reception of attaching bolts and the cover is secured to the tire carrier by means of attaching bolts 82 passing through these openings and threaded into the arms 60. In order to expose the rear signal lamp, the central portion 78 of the tire cover is provided with an opening through which this lamp may be seen. The number plate 66 is attached directly to the central portion 78 of the tire cover.

The tire cover above described has the advantages that it is strong and durable in construction and that it will efficiently protect the tire both from the weather and from injury to which the tire may be subjected in case of collision by contact of another car with the tire. The cover being made of relatively stiff sheet material will maintain its shape so that it will always present a smooth attractive outer surface. When made of sheet metal, the principal parts of the cover may be stamped out with suitable dies, thereby enabling the covers to be made in quantities at a relatively small cost. The cover may be enameled in any desired color, and when made of sheet metal may be plated with nickel. A cover of the construction shown in the drawing of this application will be highly attractive in appearance and will add greatly to the beauty of the car. The cover in each case may be quickly and easily applied to the tire and as quickly and easily detached therefrom.

In the light of the foregoing, it will be evident that I have provided a novel spare tire and cover assembly on an automobile in which assembly the support has a series of radial arms to which arms the spare tire cover is centrally secured by means of a plurality of fastening elements or bolts spaced about the axis of the tire. These bolts not only as a result of their arrangement secure the cover to the remaining structure of the spare tire assembly but in addition thereto center the cover on the tire and also serve to prevent turning of the cover on the tire.

Now I desire it understood that while I have illustrated and described in detail the preferred embodiments of this invention, the invention is not to be thus limited but only insofar as defined by the scope and spirit of the appended claims.

I claim as my invention:

1. In a device of the class described, a wheel rim for supporting a spare tire, a carrier having an attaching spider engageable with the wheel rim for securing the latter, a cover for the tire and having means cooperating with the spider for securing the cover in position, said means comprising ears adapted to overlie the spider arms, and fastening elements for securing said ears to said arms.

2. In combination in a vehicle spare tire assembly, a supporting member projecting from the vehicle, a circular spare tire support connected to said member, and a spare tire cover having a central portion apertured inwardly of the tire and a plurality of fastening means in the apertures of said central portion spaced about the axis of the spare tire for securing said central portion of the cover to said support.

3. In combination in a vehicle spare tire assembly, a spare tire supporting member including laterally projecting stud means spaced about the axis of the tire, and a spare tire cover including a side portion formed to be disposed over on outer side wall of the tire and having a central portion apertured to accommodate said stud means for clamping said central portion of the cover to said supporting member, said stud means comprising threaded shanks threaded into said tire supporting member.

4. In combination in a vehicle spare tire assembly, a spare tire supporting member including laterally projecting stud means inwardly of the tire and spaced about the axis of the tire, and a spare tire cover including a side portion formed to be disposed over an outer side wall of the tire and having a central portion apertured inwardly of the tire to accommodate said stud means for clamping said central portion of the cover to said supporting member, said stud means being so arranged as to aid in centering the cover on the tire and to prevent turning of the cover relative to the tire.

GEORGE ALBERT LYON.